United States Patent [19]
Schultheis et al.

[11] Patent Number: 5,488,779
[45] Date of Patent: Feb. 6, 1996

[54] ELECTRONIC LEVEL WITH STEREO SOUND INDICATION

[75] Inventors: Gary R. Schultheis, Los Gatos; Charles E. Heger, Saratoga, both of Calif.

[73] Assignee: Zircon Corporation, Campbell, Calif.

[21] Appl. No.: 289,409

[22] Filed: Aug. 12, 1994

[51] Int. Cl.⁶ .................................................. G01C 9/06
[52] U.S. Cl. ............................................. 33/366; 340/689
[58] Field of Search ........................... 33/340, 341, 343, 33/365, 366; 340/689

[56] References Cited

U.S. PATENT DOCUMENTS

| | | | |
|---|---|---|---|
| 2,754,497 | 7/1956 | Wolpert | 340/689 |
| 3,204,233 | 8/1965 | Olliff | 340/689 |
| 3,861,052 | 1/1975 | Siegfried | 33/366 |
| 4,349,809 | 9/1982 | Tomes | 340/689 |
| 4,484,393 | 11/1984 | LaFreniere | 33/366 |
| 4,697,174 | 9/1987 | Viator, Sr. | 340/689 |
| 4,912,662 | 3/1990 | Butler et al. | 33/346 |
| 5,083,383 | 1/1992 | Heger | 33/366 |
| 5,259,118 | 11/1993 | Heger | 33/366 |
| 5,313,713 | 5/1994 | Heger et al. | 33/366 |
| 5,322,441 | 6/1994 | Lewis et al. | 33/366 |

FOREIGN PATENT DOCUMENTS

WO94/04888   3/1994   WIPO .

Primary Examiner—William A. Cuchlinski, Jr.
Assistant Examiner—G. Bradley Bennett
Attorney, Agent, or Firm—Skjerven, Morrill, MacPherson, Franklin & Friel; Norman R. Klivans, Jr.

[57] ABSTRACT

An electronic level includes two loudspeakers, one located at each end of the level housing (beam) and controlled in a stereo-like manner. Thus the volume balance between the two loudspeakers is controlled by the angular inclination of the level. The user hears the volume difference between the two loudspeakers and thus has an auditory cue in which direction to rotate the level to achieve exact level or plumb. The loudspeakers are located at the extreme ends of the level housing to achieve maximum stereo separation. The separation reinforces the user's natural binaural hearing capability in order to distinguish which loudspeaker is turned on or off. The loudspeakers are turned on or off so that at level or plumb both loudspeakers are on. For an out of level conditions one loudspeaker is on and the other is off; the end of the level which is high when out of level has its loudspeaker on, and the other loudspeaker is off.

11 Claims, 2 Drawing Sheets

ELECTRONIC LEVEL WITH STEREO SOUND INDICATION

BACKGROUND OF THE INVENTION

1. Field of the Invention

This invention relates to inclination measuring devices and more specifically to a level device providing an audible indication of the level/plumb condition or its absence.

2. Description of the Prior Art

Electronic levels for use e.g. by carpenters are well known; examples are shown in U.S. Pat. No. 4,912,662 issued to Butler, et al., U.S. Pat. No. 5,313,713 issued to Charles E. Heger, et al., U.S. Pat. No. 5,083,383 issued to Charles E. Heger, and U.S. Pat. No. 5,259,118 issued to Charles E. Heger, and International Patent Application No. PCT/US93/07434 published Mar. 3, 1994 (Int'l. Pub. No. W094/0488), all incorporated by reference. It is also known for an electronic level, in addition to a visual electronic or electrical display of the level/plumb condition, to provide an audible tone at the precise position of level or plumb or at some preselected arbitrary amount of inclination (designated as the null position) and equivalent to level or plumb.

This audible indication is especially useful for long electronic levels (such as used by professional builders) that are typically of length 4 feet, 6 feet or even longer, and where it is difficult for the user to be positioned close enough to the visual display to conveniently read the indication. Additionally, it is known for electronic levels to provide an audible tone that represents the angular position, i.e. amount of inclination through the use of multiple audible tones. See U.S. Pat. No. 5,313,713 to Heger et al.

However, it has been found by the present inventors that such indication of angular position using multiple tones is somewhat confusing and requires an interpretation of the various tones (such as the tones of a musical scale), to many people the meaning of which is not intuitively obvious or even audible. Hence such levels have been found to be of limited usefulness in terms of the audible indication.

There is a need for a better audible indication for electronic levels, where the audible indication is intuitively understood and is readily translated in the mind of the user to a clear indication of level/plumb or the direction of inclination from level/plumb.

SUMMARY OF THE INVENTION

In accordance with the present invention, an electronic level includes two sound generators (i.e. loudspeakers), one located at (or near) each end of the level housing ("beam") which is typically an elongated structure. Electronic circuitry in the level controls the volume (sound amplitude) of each of the two loudspeakers in a stereo-like process. Thus the volume balance (the relative sound volume of the two loudspeakers) is controlled in accordance with the angular position of the level (its inclination). The user hears a volume difference between the two loudspeakers indicating a deviation from the null position. This provides the necessary auditory cues to the user as to which direction to rotate the level device to achieve the exact level or plumb position.

In one embodiment, the loudspeakers which may be any type of sound generator are each located at one of the extreme ends of the level housing to achieve maximum stereo audible separation. This separation reinforces the user's natural binaural hearing capability in order to easily hear which loudspeaker is turned on or turned off. In one embodiment the loudspeaker volume control for each loudspeaker is either all on or all off. However, this is not limiting. The loudspeaker volume or loudness control is used in one embodiment in conjunction with a segmented visual display as described in the above-referenced patents. The stereo audio cues can also be provided with other types of visual displays or without any visual display.

In one embodiment at the exact null position (such as level/plumb) the loudness (volume) of both loudspeakers is at the "full on" amplitude. For deviations from level/plumb (the null position) the volume of only one loudspeaker is turned on and the other loudspeaker is turned off. For example, for a counterclockwise rotation of the level device from the level position, the right end of the level device is high and in accordance only the right end loudspeaker is turned on. For a clockwise rotation, the left end of the level device is high and only the left end loudspeaker is turned on. Thus by hearing which end of the level device is "high" in terms of volume, the user knows in which direction to rotate the level device to reach exact level or plumb because the corresponding physical end of the level device is also "high" i.e. deviated from the null position. Outside the dynamic window range (operable sensing range) of the level device, in either the clockwise or counterclockwise rotation directions, both loudspeakers are turned off to indicate an "out of range" condition.

The actual tones emitted by the loudspeakers in accordance with the invention may be a single tone, multiple tones as in the musical scale, or any other type of audible sound. This is because the actual indication here is provided by the volume and not the pitch of the emitted sound.

DETAILED DESCRIPTION OF THE INVENTION

Figure 1:
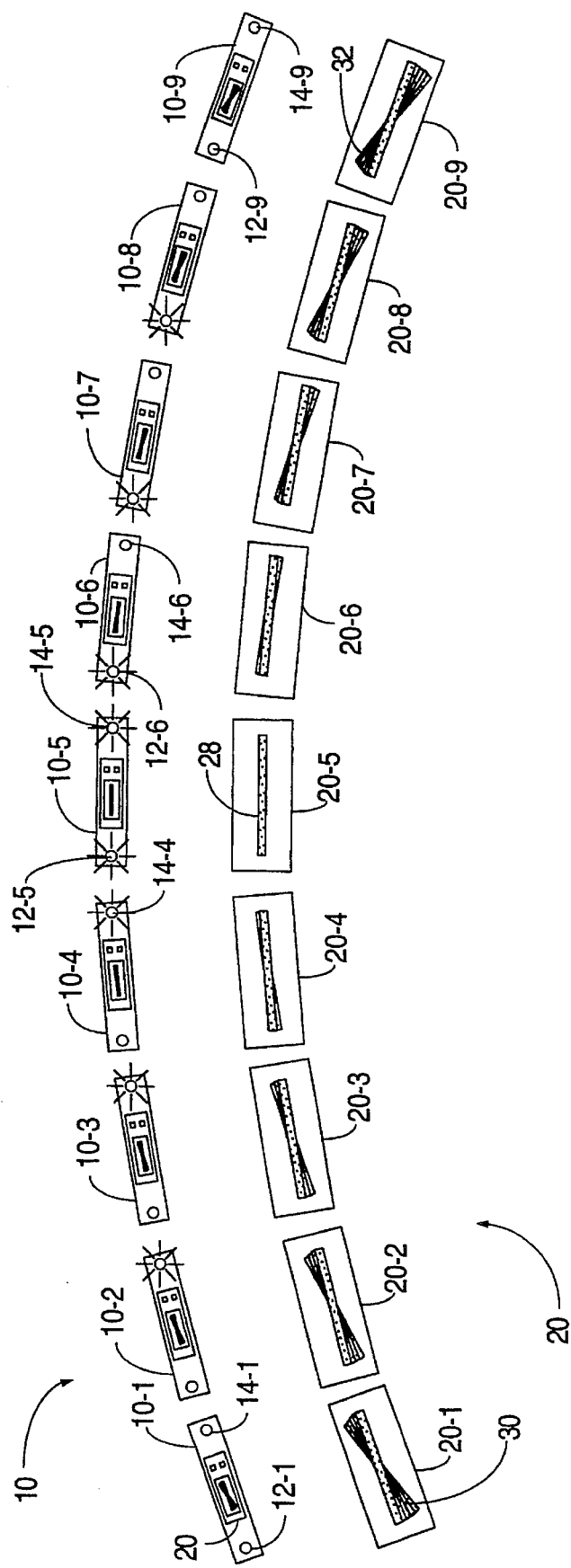
FIG. 1 shows diagrammatically various positions of a level as shown by the visual display and the associated operation of stereo loudspeakers mounted on the level.

FIG. 1 shows diagrammatically the operation of an electronic level having mounted on its housing, at either end thereof, loudspeakers which operate as described above to provide a stereo indication, by means of speaker volume, of the inclination of the level.

The upper row in FIG. 1 shows nine depictions of the identical level 10. Each depiction (i.e. 10-1) includes a central conventional visual display 20 and mounted at either end of the housing, a first (left end) loudspeaker e.g. 12-1 and a second (right end) loudspeaker e.g. 14-1. It is to be understood that these loudspeakers are any type of sound emitter and not limited to conventional loudspeakers driven by amplifiers but may be e.g. piezo-electric buzzers, beepets, or other sound emitting devices so long as the volume thereof is controllable. It is also to be understood that the visual display 20 shown here is not limiting but is merely exemplary and indeed in certain embodiments there is no visual display, but the only indication provided is the audible one by the loudspeakers.

The level device 10 of FIG. 1 is depicted in nine different positions 10-1 to 10-9. The central position 10-5 is the level (horizontal) position. It is also to be understood that this may be the plumb position (vertical). On either side of the central depiction 10-5 are shown four degrees of inclination from the level (null) position. The amount of inclination is better understood by the bottom row in FIG. 1 which depicts the visual display 20 corresponding to each depicted level position in an enlarged view. This visual display 20 is of the multi-segment type described in copending and commonly owned U.S. patent application Ser. No. 08/277,058, filed Jul. 19, 1994, entitled "Electronic Level Displaying Inclination Using a Multi-Segment Fan-Like Display"; incorporated by reference. As can be seen, at the null (level) position 20-5 the visual display 20 is of a level "center bar" 28. Depending on the degree of inclination, various numbers of "inclination bars" are illuminated (this is e.g. an LCD display so the illuminated display segments are darker than the background). The greater degree of inclination the more inclination bars are illuminated. Thus in the leftmost display 20-1, maximum inclination is shown by inclination bars 30 with the left end of the level 10-1 being down, i.e. a counterclockwise rotation. The rightmost display 20-9 in FIG. 1 shows the maximum inclination in the clockwise direction with inclination bars 32 with the right end of the level 10-9 thereby being down.

The corresponding operation of the loudspeakers in terms of their volume is depicted in the upper row of FIG. 1 where an activated (on) loudspeaker is shown diagrammatically as emitting sound waves (shown conventionally as small squiggles emitting from the loudspeaker). Thus in the center or level position 10-5 depicted the upper row in FIG. 1, both loudspeakers 12-5, 14-5 are activated at the same sound volume. For the position 10-4 depicted immediately to the left of the position 10-5, since the level device is now not level but has its right end slightly higher (inclined), only the right end speaker 14-5 emits sound. The same is true for the adjacent depiction 10-3 and for the third depiction 10-2 to the left of the center depiction 10-5.

For the leftmost depiction 10-1 of inclination, this is outside the measurable inclination range of the inclination sensor in level 10, and so both speakers 12-1, 14-1 are inactive (silent).

The right hand portion of FIG. 1 is symmetric to the left. Thus, for the depiction 10-6 immediately to the right of the center, only the left end speaker 12-6 is active and the right end speaker 14-6 is silent, indicating that the left end of the level is high, i.e. the volume of the left end speaker 12-6 is high. The same is true for the next depiction 10-7 and or the next depiction 10-8. In the right most depiction 10-9 both speakers 12-9, 14-9 are silent since the level is again out of its measurable inclination range.

Thus the user intuitively understands that the particular speaker volume being on indicates that the associated end of the level device is high, and therefore to achieve the level condition the level device (and of course the member against which it is being rested) must be rotated so as to reduce the elevation of the active speaker end of the level relative to the other end of the level.

Therefore an intuitively understood audible cue is provided to the user of how to bring the level device to level or plumb or other (arbitrary) inclination condition.

It is to be understood that while in the above described embodiment each loudspeaker is either on or off, in other embodiments various incremental levels of volume are used to indicate the amount of inclination. Thus for instance for a slight deviation from level, one loudspeaker would be 80% as loud as the other loudspeaker, while in the maximum amount of inclination one loudspeaker would be off and the other would be at its maximum volume. However, it has been found that determinations of relative volume are relatively difficult for the typical user and thus in the preferred embodiment each loudspeaker is all on or all off to indicate level/plumb or its absence.

Electronic circuitry to achieve the stereo operation described above is readily understood by one skilled in the art. Many different types of electronic circuitry may achieve the above-described stereo audible indication; the following description is illustrative of only one type of such circuitry, and is not limiting. Other types of circuitry involving any type of logic which controls the operation of two loudspeakers is usable in accordance with the present invention. It is also to be understood that the following description of electronic circuitry is for the above-described preferred embodiment, and other embodiments using degrees of volume control would require modifications to the circuitry; however, such modifications are well within the skill of one of ordinary skill in the art, especially given the content of the above-referenced patent disclosures.

Figure 2:
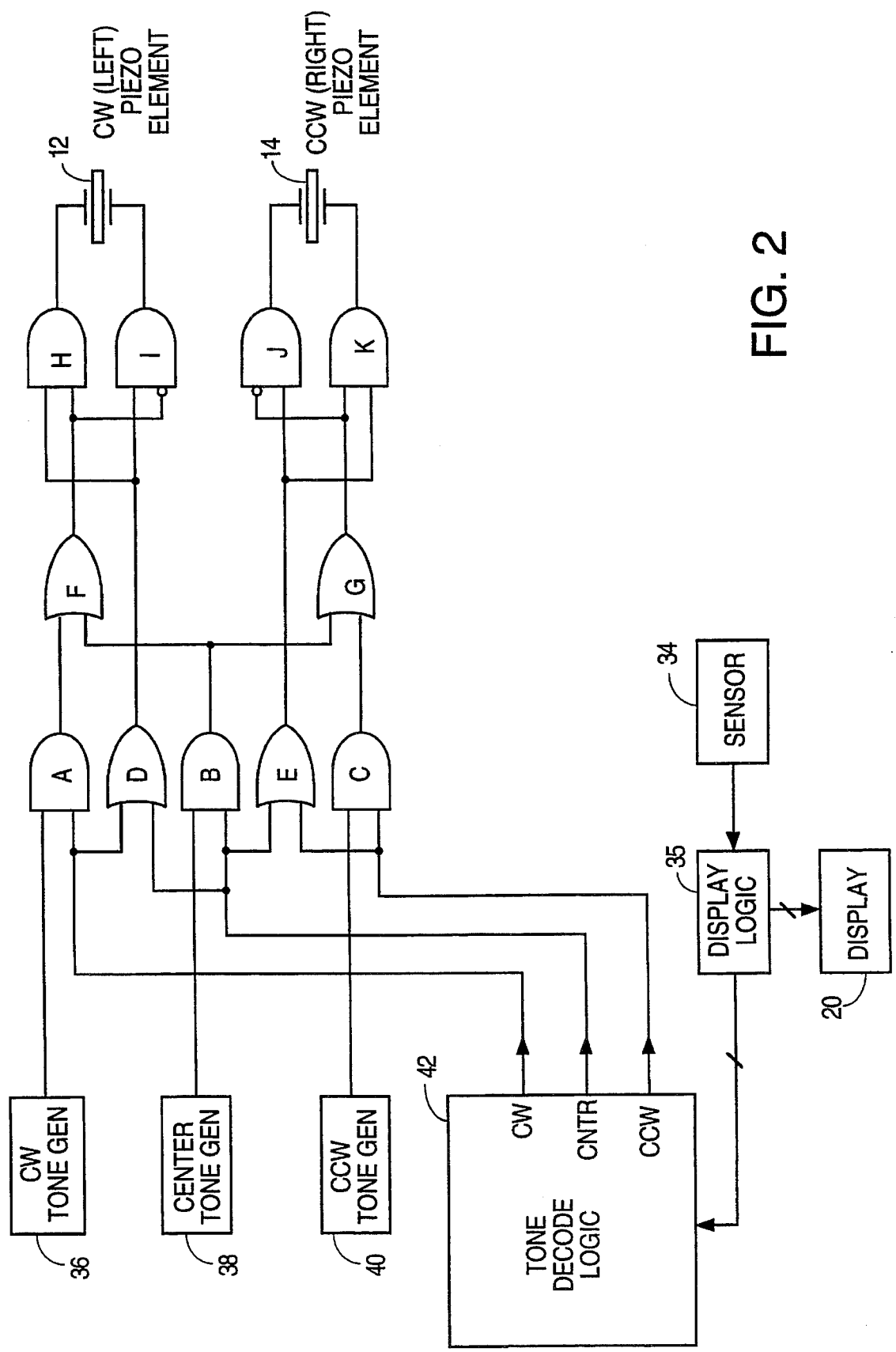
FIG. 2 shows electronic circuitry in accordance with the present invention.

FIG. 2 shows the electronic circuitry for one embodiment of the invention for generating the audible indications described above. FIG. 2 depicts the sound generator elements 12 and 14 which here are conventional piezoelectric beeper-type elements. Sound generator 12 is the clockwise (left) sound generator and piezoelectric element 14 is the counterclockwise (right end) sound generator element as in FIG. 1. The tone generation control circuitry (which thereby controls the volume) includes a clockwise CW (left end) tone generator 36, a center tone generator 38, and a counterclockwise CCW (right end) tone generator 40. In one embodiment tone generators 36, 38, 40 each generate 50% duty cycle square waves at different frequencies. In one embodiment these frequencies are respectively 437 Hz, 625 Hz, and 875 Hz. Provision of these different frequencies is to utilize user-spatial sound discrimination, and is not necessary to the invention.

Conventional inclination sensor 34 provides electric signals indicative of inclination to conventional display logic 35, which drives conventional visual display 20.

Tone decoder logic 42 provides enable signals at output terminals CW, CNTR, CCW, for respectively the left sound generator element 12 (CW), for both sound generator elements 12 and 14 (CNTR), and for the right sound generator element 14 (CCW). The input signals to tone decoder logic 42 are provided from the conventional display logic 35 of the type described in the above-referenced patent disclosures and hence not shown here in detail. Logic gates A to K provide the logic for operation of the sound generator elements 12 and 14. AND gates A, B, and C combine individual tones with their respective enable signals CW, CNTR, and CCW from tone decode logic 42. OR gates D and E combine only the enable signals of respectively CW OR CNTR and CCW OR CNTR.

OR gates F and G provide an OR function between the enabled tones (only one is active at a time) of CW OR CNTR and CCW OR CNTR.

AND gates H, I and J, K are differential piezoelectric drivers with an enable input from respectively gates D and E and a tone input from respectively gates F and G. This separate enablement for the piezoelectric drivers H, I, J, and K ensures that each pair of differential drivers, H, I and J, K, are at logic zero when the piezoelectric drivers are disabled. Thus no direct voltage signal is impressed upon the piezoelectric sound elements 12 and 14 when tones are not present. It is useful to suppress any average DC signal because such a signal degrades long term performance of the piezoelectric elements 12 and 14.

It is to be understood that the tone decode logic 42 in this embodiment requires indication of a set of at least five conditions from display logic 35. These are the level/plumb condition, the CW condition, the CCW condition, and the two out of range conditions. It is to be understood that if varying levels of sound volume are to be provided by sound generators 12 and 14, additional inclination conditions must be determined and an indication of same provided to tone decoder logic 42, thereby to indicate the intermittent levels of inclination and hence generate corresponding intermittent sound volume levels.

The logic circuitry shown here can be logically simplified by Boolean algebra or other means and is meant to be illustrative of functionality.

The above description is illustrative and not limiting; further modifications will be apparent to one skilled in the art and are intended to fall within the scope of the appended claims.

I claim:

1. An electronic inclination sensing device, comprising:
   an elongated housing defining a longitudinal axis;
   a first sound generator located near a first end of said housing and a second sound generator located near a second end of said housing;
   a control operatively connected to said first and second sound generators and mounted in said housing; and
   an inclination sensor operatively connected to said control and mounted in said housing;
   wherein at a null position of said inclination sensor, said control operates both said first and second sound generators at a predetermined volume level; and
   at an inclined position of said sensor, said control operates one of said first and second sound generators at a higher volume than the other of said first and second sound generators.

2. The device of claim 1, wherein when the inclination sensor is inclined so that said first end of said housing is higher than said second end, said first sound generator is operated at the higher volume, and when the inclination sensor is inclined so that said second end of said housing is higher than said first end, said second sound generator is operated at the higher volume.

3. The device of claim 1, further comprising an out-of-range detector operatively connected to said inclination sensor and to said control, wherein outside the range of said inclination sensor, the volume of said first and second sound generators is controlled to be off.

4. The device of claim 1, wherein each of said first and second sound generators emits at least one tone.

5. The device of claim 4, wherein each of said first and second sound generators emits multiple tones.

6. The device of claim 1, wherein said null position is level or plumb.

7. The device of claim 1, wherein said null position is any predetermined inclination relative to the direction of the earth's gravitational field.

8. The device of claim 1, further comprising a visual inclination display mounted on said housing.

9. The device of claim 1, wherein at the null position the sound generators operate at a first frequency, and at the inclined position said one of said first and second sound generators operates at a second frequency.

10. The device of claim 1, wherein the control includes:
    tone decoder logic operatively connected to said inclination sensor and having at least three output terminals;
    at least three tone generators each having an output terminal;
    a plurality of logic gates each having two input terminals, one terminal of each logic gate being connected to an output terminal of one of said tone generators, and a second terminal of each logic gate being connected to one output terminal of said tone decoder logic;
    wherein each of the logic gates has an output terminal operatively connected to one of said sound generators.

11. An audible method of indicating inclination of an elongated device, comprising the steps of:
    providing a sound generator located near each end of the device;
    determining an inclination of the device;
    if the device is determined to be at a null inclination position, providing an equal sound volume from both of the sound generators;
    if the device is determined to be inclined from said null position, providing a louder sound volume from a predetermined one of the sound generators than from the other of the sound generators; and
    if the device is determined to be inclined more than a predetermined amount, providing no sound from either sound generator.

* * * * *